United States Patent
Ito et al.

(10) Patent No.: US 6,869,119 B2
(45) Date of Patent: Mar. 22, 2005

(54) BRACKET ATTACHING STRUCTURE

(75) Inventors: Osamu Ito, Shizuoka (JP); Masaharu Hoshino, Shizuoka (JP); Toru Hori, Shizuoka (JP); Kenichiro Hatono, Shizuoka (JP)

(73) Assignee: Suzuki Motor Corporation, Shizuoka (JP)

( * ) Notice: Subject to any disclaimer, the term of this patent is extended or adjusted under 35 U.S.C. 154(b) by 0 days.

(21) Appl. No.: 10/754,516

(22) Filed: Jan. 12, 2004

(65) Prior Publication Data

US 2004/0140682 A1 Jul. 22, 2004

(30) Foreign Application Priority Data

Jan. 20, 2003 (JP) .................................... P. 2003-010562

(51) Int. Cl.$^7$ ................................................. B60N 3/02
(52) U.S. Cl. ................................. 296/1.02; 296/187.05
(58) Field of Search .......................... 296/1.02, 187.05, 296/187.12, 193.05, 210, 203.03; 16/110.1, 410, DIG. 24; 188/376, 377, 371; 280/748; D12/178; 49/460

(56) References Cited

U.S. PATENT DOCUMENTS

| | | | | |
|---|---|---|---|---|
| 5,163,730 A | * | 11/1992 | Welch | 296/187.05 |
| 5,735,569 A | * | 4/1998 | Takagi et al. | 296/210 |
| 6,042,176 A | * | 3/2000 | Ikeda et al. | 296/187.05 |
| 6,095,593 A | * | 8/2000 | Johann et al. | 296/187.05 |
| 6,126,230 A | * | 10/2000 | Ikeda et al. | 296/187.05 |
| 6,367,871 B2 | * | 4/2002 | Grimm et al. | 296/210 |
| 6,367,872 B1 | * | 4/2002 | Bohm et al. | 296/210 |
| 6,390,541 B2 | * | 5/2002 | Grimm et al. | 296/214 |
| 6,431,640 B1 | * | 8/2002 | Sakuma et al. | 296/187.05 |
| 6,517,144 B2 | * | 2/2003 | Kobayashi | 296/187.05 |
| 6,623,068 B2 | * | 9/2003 | Wieschermann et al. | 296/210 |
| 6,679,538 B1 | * | 1/2004 | Sturt | 296/97.9 |

FOREIGN PATENT DOCUMENTS

| | | | | |
|---|---|---|---|---|
| DE | 10022111 | | 11/2001 | |
| DE | 69720171 | | 10/2003 | |
| JP | 358053515 A | * | 3/1983 | 296/210 |
| JP | 363240477 A | * | 10/1988 | 296/210 |
| JP | 402171356 A | * | 7/1990 | 296/210 |
| JP | 10-181490 | | 7/1998 | |

OTHER PUBLICATIONS

English Languarge Abstract of JP 10–181490.

* cited by examiner

Primary Examiner—D. Glenn Dayoan
Assistant Examiner—H. Gutman
(74) Attorney, Agent, or Firm—Greenblum & Bernstein, P.L.C.

(57) ABSTRACT

A closed section is formed by bonding upper end portions and lower end portions of respectives of a roof side inner panel and a side body outer panel of an vehicle. A base bracket attached to a roof side inner panel for mounting an assistant grip and a grip bracket attached to the base bracket are provided to a side of an inner vehicle compartment of the roof inner panel. Further, a beam portion of the base bracket is fixed to the roof side inner panel to project to an upper side or a side of a vehicle compartment of an upper end portion side bonding portion of the roof side inner panel and the side body outer panel.

4 Claims, 8 Drawing Sheets

BRACKET ATTACHING STRUCTURE

BACKGROUND OF THE INVENTION

The present invention relates to a bracket attaching structure of an attaching bracket for forming a closed section by a roof side inner panel and a side body outer panel of a vehicle and mounting an assistant grip to an inner compartment side of a roof inner panel.

FIG. 11 is a sectional view of a roof side rail portion 51 of a vehicle in a conventional art. As disclosed in JP-A-10-181490 (Japanese Patent Application Publication Number: Hei10-181490) and FIG. 11, in a vehicle structure of a conventional art, the roof side rail portion 51 forms a closed section 57 by bonding two upper and lower end portions of a roof side inner panel 52 and a side body outer panel 53. An attaching bracket 54 having substantially a hat-like sectional shape is fixed to an inner compartment side of the roof side inner panel 52 by welding. The attaching bracket 54 is for attaching an assistant grip, not illustrated, (refer to an assistant grip 3 of FIG. 2), an attaching hole 54b for attaching the assistant grip is formed at a top portion 54a of the attaching bracket 54. An interior panel 55 for a ceiling is arranged from a ceiling portion of the vehicle over to the roof side rail portion 51 to cover the attaching bracket 54 and a side end portion of the interior panel 55 is extended up to a lower side bonding portion 58 of the roof side inner panel 52 and the side body outer panel 53.

When a passenger grasps the assistant grip, large load is applied to the attaching bracket. Therefore, it is necessary to increase strength of attaching the attaching bracket 54 and the shape of the attaching bracket 54 becomes complicated and enlarged. Therefore, a large portion of an interval between the roof side inner panel 52 and the interior panel 55 is occupied by the attaching bracket 54. Meanwhile, a curtain air bag 56 tends to be mounted to the roof side rail portion 51 for ensuring safety.

As described above, the space between the roof side inner panel 52 and the interior panel 55 is occupied by the attaching bracket 54 and therefore, there is no room for arranging the curtain air bag 56. Therefore, as shown by FIG. 12, respectives of the roof side inner panel 52 and the side body outer panel 53 are provided with extended portions L to thereby arrange the curtain air bag 56 at the interval between the roof side inner panel 52 and the interior panel 55.

However, when the extended portions L of the roof side inner panel 52 and the side body outer panel 53 are extended to an upper side of a vehicle body, a vehicle height is increased and when the extended portions L are extended to a lower side of the vehicle body, a window frame forming area is reduced and a fine view is not commanded, further, ride-in and ride-out performance is deteriorated, both of which are not preferable. Further, when a vehicle body mounted with a curtain air bag and a vehicle body which is not mounted with the curtain air bag are designed separately, production cost of the vehicle body is increased.

SUMMARY OF THE INVENTION

The invention has been carried out in view of the problem and it is an object thereof to provide a bracket attaching structure for ensuring a space of arranging a part of a curtain air bag or the like at a roof side rail portion without changing a shape of a body of a conventional art.

In order to achieve the above-described object, according to a bracket attaching structure of the present invention, there is provided a bracket attaching structure for a vehicle comprising a closed section formed by bonding upper end portions and lower end portions of respectives of a roof side inner panel and a side body outer panel, and an attaching bracket for mounting an assistant grip on an inner vehicle compartment side of the roof side inner panel, wherein the attaching bracket includes a base bracket attached to the roof side inner panel and a grip bracket attached to the base bracket, and an upper end portion of the base bracket is fixed to the roof side inner panel to project to a side of a vehicle compartment or an upper side of the vehicle compartment from a bonding portion where the upper end portions of the roof side inner panel and the side body outer panel are bonded thereon.

According to the present invention, more preferably, the grip bracket includes a curved face in which a sectional shape thereof in a vehicle width direction is formed substantially in a hat-like shape, and a extending direction of one face constituting the curved face in the hat-like shape substantially coincides with a direction of applying a load of the assistant grip.

Further, according to the present invention, more preferably, each of the base bracket and the grip bracket can be formed with at least either one or both of a flange and a bead for reinforcement.

Further, according to the present invention, more preferably, the base bracket can be formed with an escape hole which can be penetrated by an attaching portion of the assistant grip projected from a top portion of the grip bracket to an outer vehicle compartment side when the assistant grip is attached to the grip bracket.

BRIEF DESCRIPTION OF THE DRAWINGS

FIG. 8A is a perspective view of a base bracket, FIG. 8B is a perspective view showing a state of attaching a grip bracket to the base bracket and FIG. 8C is a sectional view taken along a Z—Z line direction of FIG. 8B.

DESCRIPTION OF THE PREFERRED EMBODIMENT

A bracket attaching structure of an embodiment of the present invention will be explained in reference to the drawings as follows.

Figure 1:
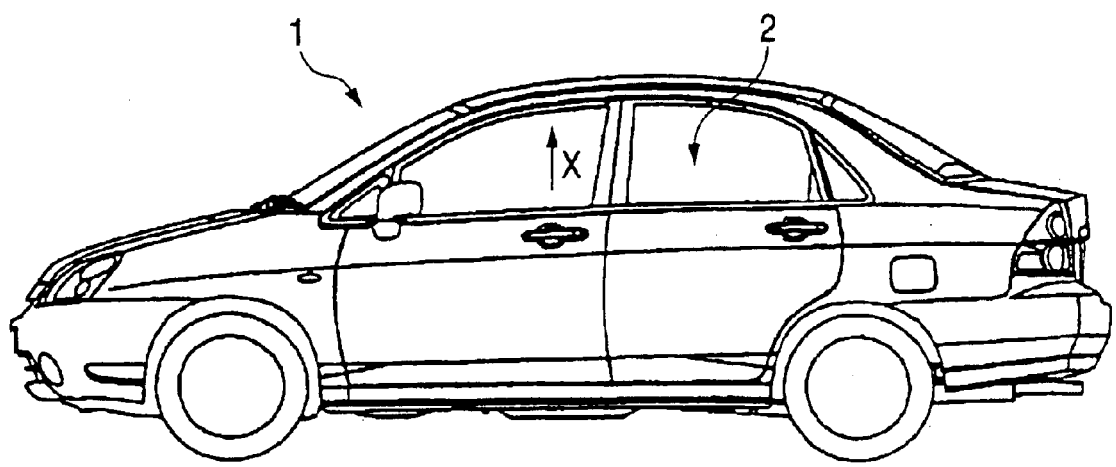
FIG. 1 is a side view of an vehicle adopting a bracket attaching structure according to an embodiment of the invention.
Figure 2:
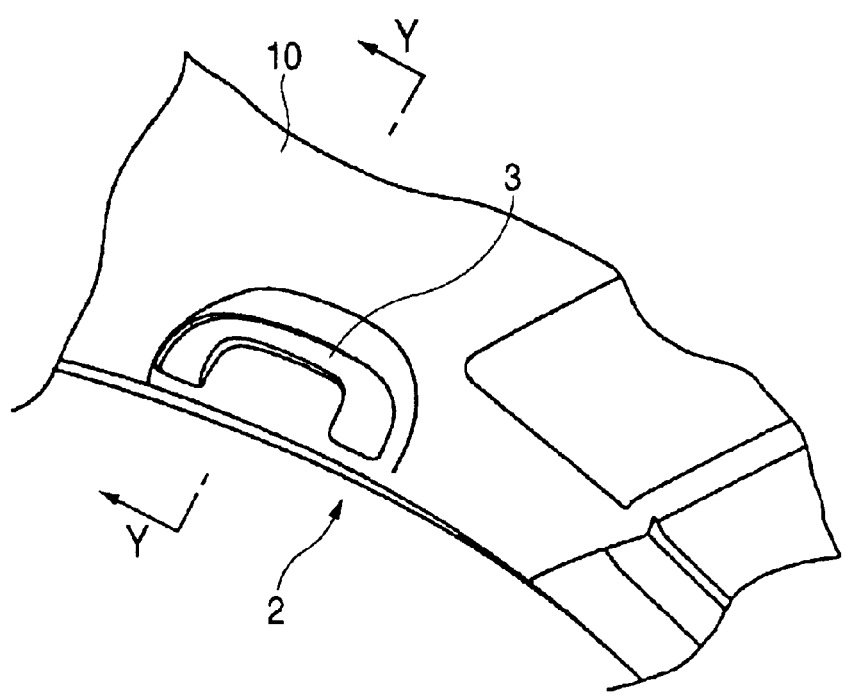
FIG. 2 is a perspective view showing a state of attaching an assistant grip viewed from an arrow mark X direction of FIG. 1.

FIG. 1 shows an vehicle 1 according to the invention and FIG. 2 shows an assistant grip 3 arranged at a side portion of a roof of an inner vehicle compartment 2 of the vehicle 1. As is well known, the assistant grip 3 is mounted with an object of achieving stability of attitude by being grasped by a passenger.

Figure 3:
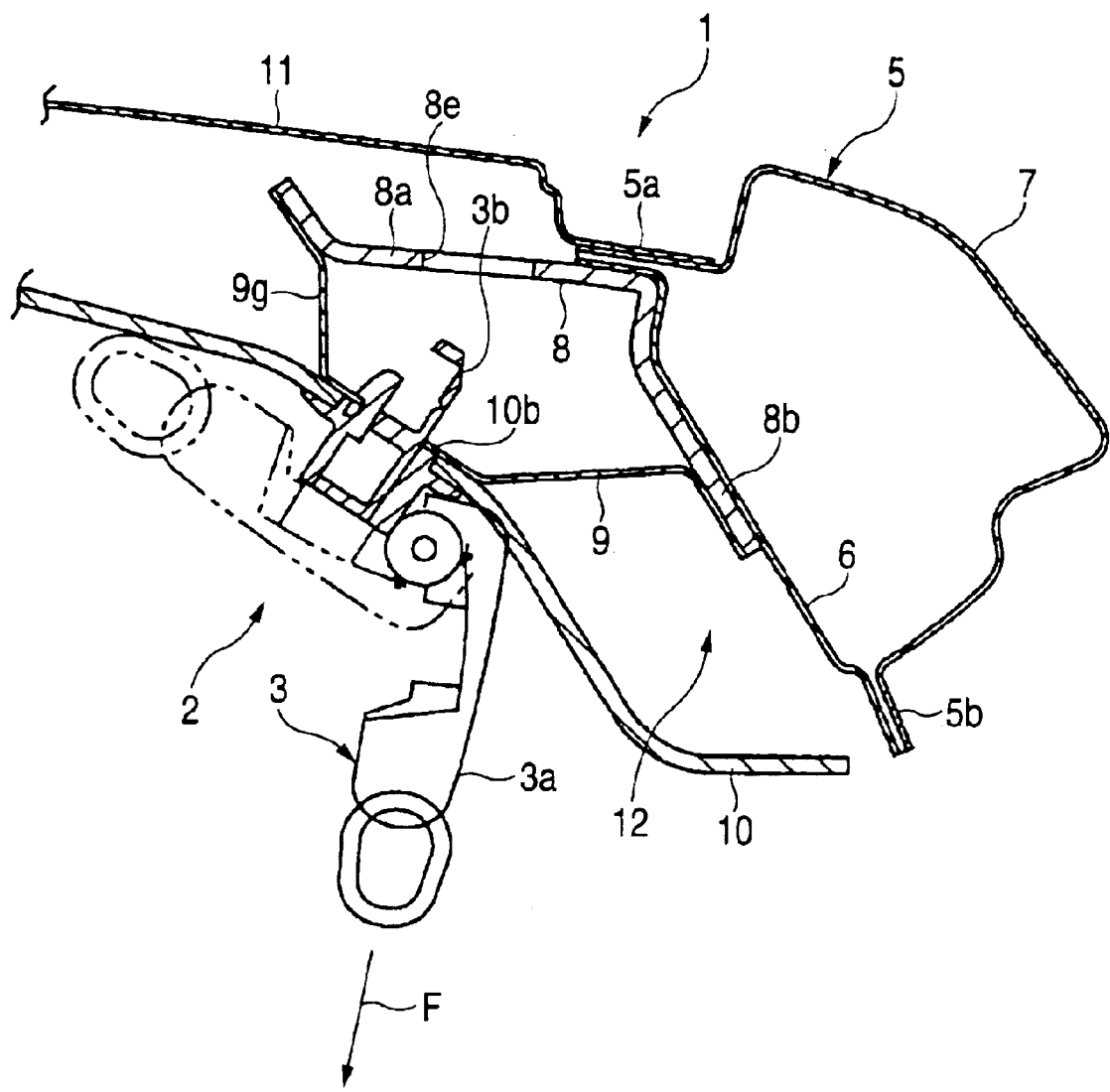
FIG. 3 is a sectional view of the state of attaching the assistant grip taken along an arrow mark Y—Y line direction of FIG. 2.

FIG. 3 is a sectional view taken along a vehicle width direction showing a state of mounting the assistant grip 3. As illustrated in the drawing, a roof side rail portion 5 of the vehicle 1 forms a closed sectional space by overlapping a roof side inner panel 6 and two upper and lower end bonding portions 5a and 5b of a side body outer panel 7 projected to an outer side to bond by welding. An attaching bracket of the assistant grip 3 is provided on an inner compartment side of the roof side inner panel 6 and the attaching bracket is constituted by a base bracket 8 attached to a roof side rail portion and a grip bracket 9 attached to the base bracket 8.

Figure 4:
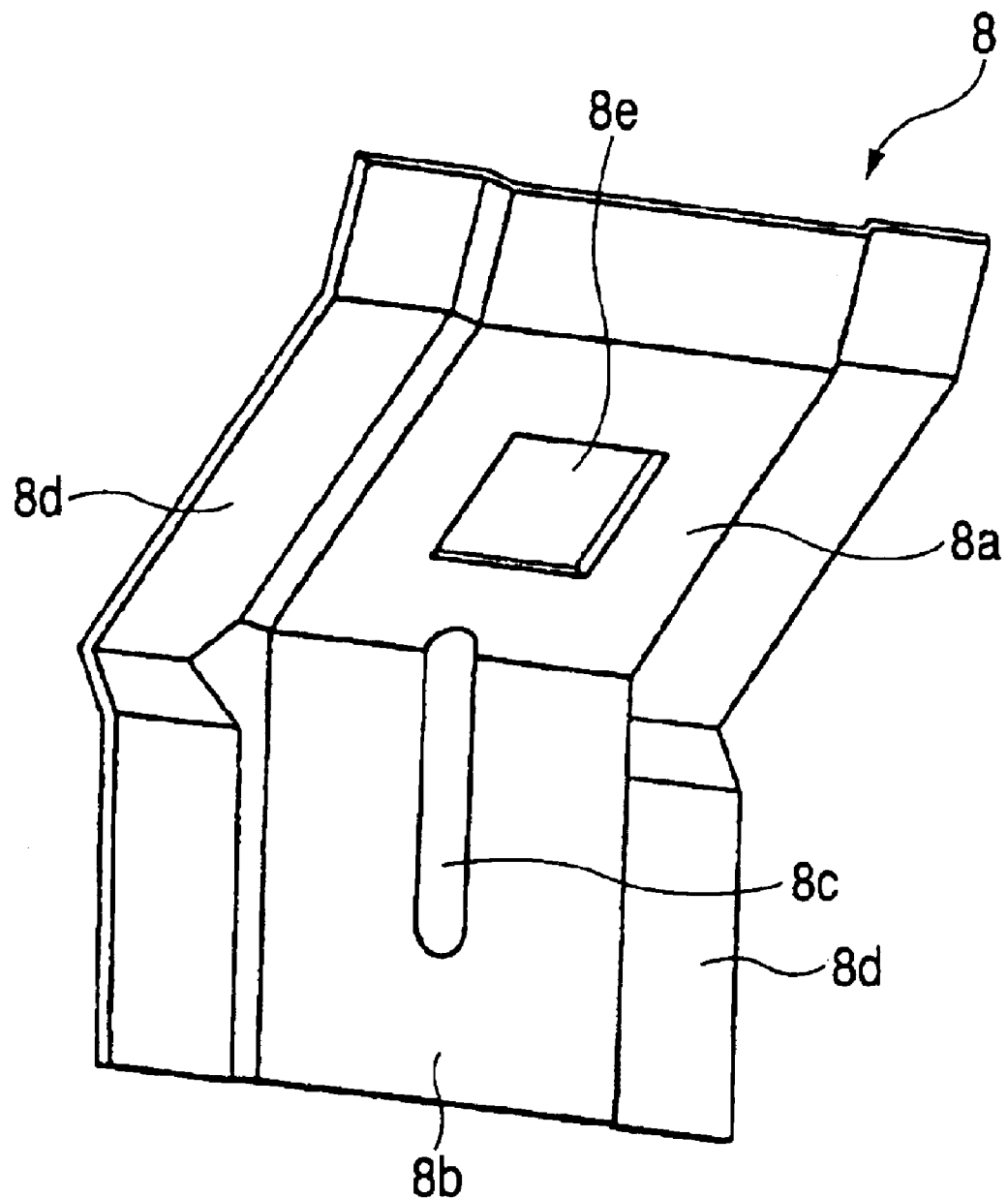
FIG. 4 is a perspective view of a base bracket shown in FIG. 3.

As shown by FIG. 4, there is used the base bracket 8 formed by bending a flat plate and having a wall thickness thicker than that of an attaching metal piece of the assistant grip which is normally used. The base bracket 8 includes a beam portion 8a on an upper end side and a fixing portion 8b on a lower end side, a lower end portion of the beam portion 8a is attached to the upper end bonding portion 5a of the roof side rail portion 5 and the fixing portion 8b is fixed to the roof side inner panel 6 by welding or by a bolt. In order to withstand load F when the passenger grasps the assistant grip 3, a bead 8c extended in an up and down direction is formed at a central portion in a left and right direction of the fixing portion 8b and flanges 8d extended in the up and down direction are formed at two left and right end portions of the base bracket 8. As shown by FIG. 3, a shape on a lower end side of substantially a central portion of the flange 8d is formed in a shape in correspondence with substantially an upper end side of the roof side rail portion 5. Further, an escape hole 8e in a quadrangular shape is formed at a center of the beam portion 8a.

Figure 5:
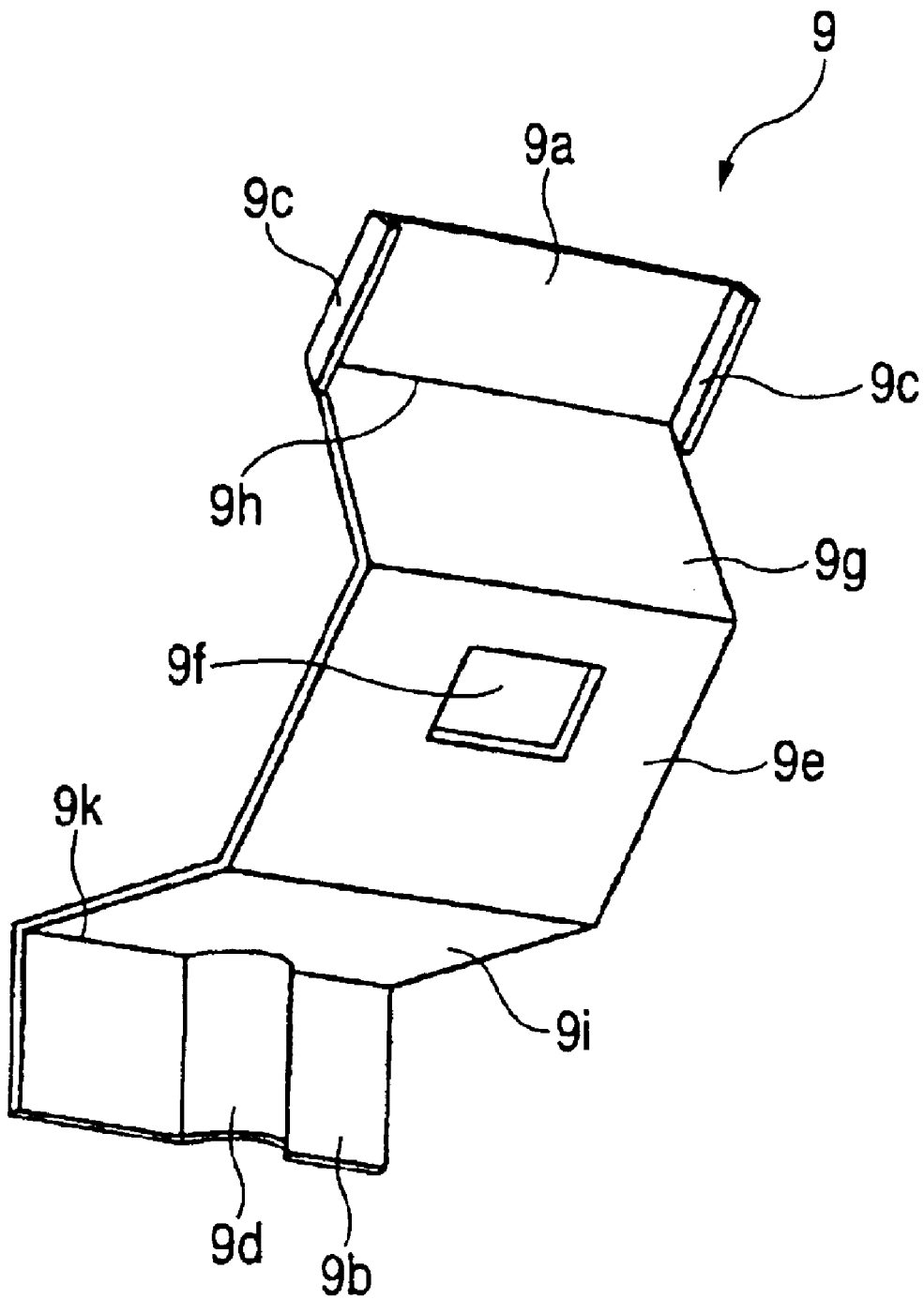
FIG. 5 is a perspective view of a grip bracket shown in FIG. 3.

In FIG. 5, the grip bracket 9 attached to the base bracket 8 is formed by a plate thinner than the base bracket 8 and a section thereof is formed in a hat-like shape, that is, attaching pieces 9a and 9b in a flange-like shape are formed at two end portions of a section thereof in a channel-like shape. Flanges 9c are formed at the two left and right end portions of the attaching pieces 9a of the upper end side on one side and a bead 9d is formed at a central portion in the left and right direction of the attaching piece 9b on the lower end side. The attaching pieces 9a and 9b are fixed at an upper end portion and a lower end portion of the base bracket 8 at positions in correspondence therewith respectively.

Figure 6:
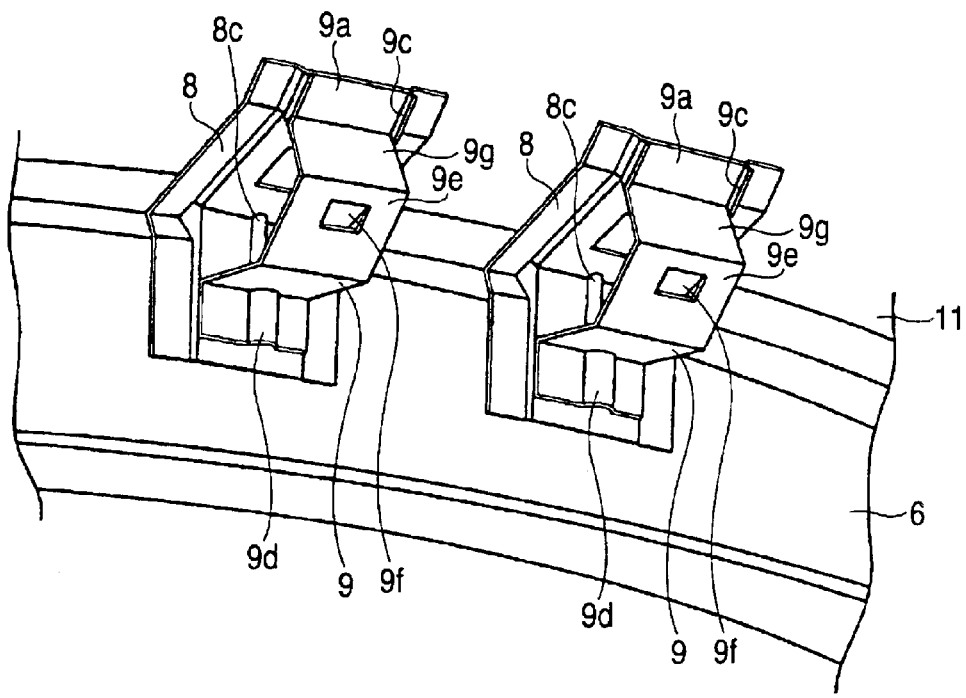
FIG. 6 is a perspective view showing a state of attaching the grip bracket in a state of removing the assistant grip shown in FIG. 2 and an interior panel.

As shown by FIG. 6, when the grip bracket 9 is fixed to the base bracket 8, a top portion 9e in a hat-like shape is projected to a side of the inner vehicle compartment 2. The grip bracket is for attaching the assistant grip 3 and the top portion 9e is formed with an attaching hole 9f for the assistant grip 3. Further, a support piece 9g on an upper side is formed between the attaching piece 9a and the top portion 9e. As shown by FIG. 3, a direction of the support piece 9g is formed to direct in a direction of pulling a grip 3a by the passenger when the passenger grasps a grip 3a of the assistant grip 3.

As shown by FIG. 5, the above-described flange 9c is extended from the attaching piece 9a to the support piece 9g over a bent portion 9h to achieve to strengthening of the bent portion 9h. Further, the bead 9d is extended from the attaching piece 9b to a support piece 9i on the lower side over a bent portion 9k to strengthen the bent portion 9k.

As shown by FIG. 3, an upper end (front end) portion of the base bracket 8 is projected from the bonding portion 5a of the roof side inner panel 6 and the side body outer panel 7 at the roof side rail portion 5 and a roof panel 11 to an inner side of the vehicle compartment 2 and supported in a beam-like shape in a state of being attached to the roof side rail portion 5.

As shown by FIG. 6, the attaching brackets of assistant grips 3 each formed by the base bracket 8 and the grip bracket 9 are provided at two locations on the inner compartment side of the roof side rail portion 5.

As shown by FIG. 3, an interior panel 10 for a ceiling is arranged from a ceiling portion of the vehicle 1 over to the roof side rail portion 5. The interior panel 10 covers the base bracket 8 and the grip bracket 9 and a side end portion of the interior panel 10 is extended up to the lower side bonding portion 5b of the roof side inner panel 6 and the side body outer panel 7.

The assistant grip 3 is fixed to a side of a vehicle body by inserting a clip 3b formed with a locking claw formed at the assistant grip 3 into a hole 10b formed at the interior panel 10 and the attaching hole 9f formed at the grip bracket 9. Further, the assistant grip 3 is pivotable, a bold line in FIG. 3 indicates a position when the passenger grasps the grip 3a and a chain line indicates a position of a state of not using the grip 3a.

According to the embodiment, in a state in which the base bracket 8 is attached to the roof side rail portion 5, the beam portion 8a of the base bracket 8 is attached to project to an inner side of the vehicle compartment 2. Therefore, a space 12 at an interval between the roof side rail portion 5 at the lower portion of the base bracket 8 and the interior panel 10 can be enlarged by moving the position of the base bracket 8 to an upper side of the base bracket of the conventional art. Therefore, the space 12 can be arranged with a curtain airbag or other vehicle body constituting part, not illustrated.

Figure 7:
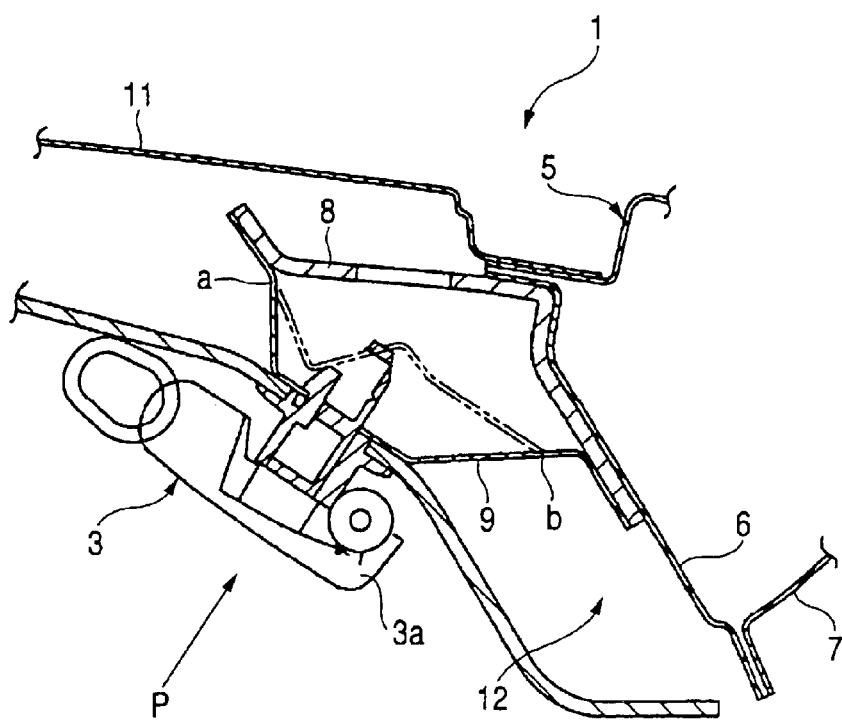
FIG. 7 is a sectional view showing a state of deforming the grip bracket when load in an upward direction is applied to the assistant grip shown in FIG. 3.

FIG. 7 shows a state when the large load is applied to the assistant grip 3.

When load P is applied to the assistant grip 3, since the material of the grip bracket is thinner than that of the base bracket 8, so far as the load P falls in a constant range, the grip bracket is plastically deformed. That is, the grip bracket 9 shown in FIG. 5 is bent to deform with vicinities a and b of terminal points of the flange 9c and the bead 9d of the grip bracket 9 as fulcra. Therefore, energy can efficiently be absorbed by deforming the top portion 9e and the support pieces 9g and 9i of the grip bracket 9. An amount of deformation can be adjusted by changing a height of the flange 9c and a size of the beam 9d of the grip bracket 9. Since the escape hole 9f is formed at the grip bracket 9, when the assistant grip 3 is attached by the clip 3b for fixing the assistant grip 3, a screw or the like, the energy can efficiently be absorbed without interfering with a front end portion of the screw with the base bracket 8. Further, since the grip bracket 9 is not present on an outer compartment side of the roof side rail portion 5, repair operation is facilitated.

Next, a modified example of the embodiment of the invention will be explained.

Figure 8A:
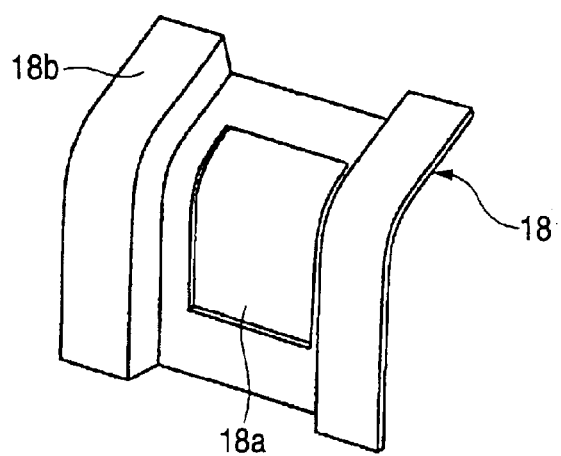
FIGS. 8A through 8C show a first modified example of the bracket attaching structure according to the embodiment of the invention.
Figure 8B:
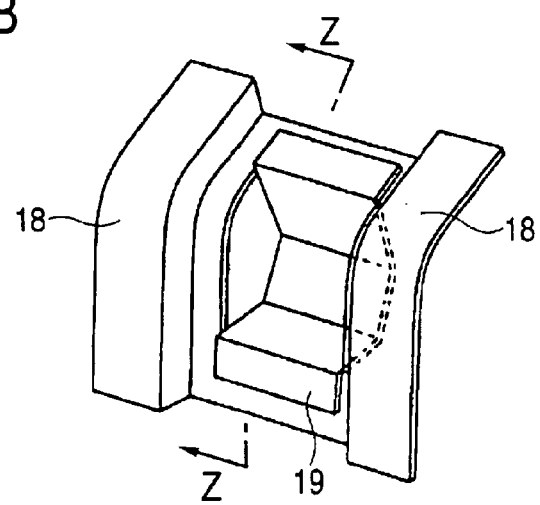
Figure 8C:
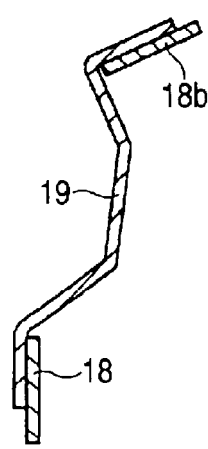

FIG. 8A shows a base bracket 18. A large attaching hole 18a is provided at a middle portion of the base bracket 18. As shown by FIGS. 8B and 8C, the attaching hole 18a is arranged with a grip bracket 19 from a side of the inner vehicle compartment 2 to thereby promote attachability of the grip bracket 19. An upper end portion 18b of the base bracket 18 is fixed to project to the vehicle compartment side of the upper end portion side bonding portion of the roof side inner panel 6 and the side body outer panel 7 shown in FIG. 3.

Further, the strength of the base bracket 18 may be increased by an amount of forming the large attaching hole 18a. Other shapes of the base bracket 18 and a method of attaching the base bracket 18 to the roof side inner panel 6 are the same as that of the example of the prior art. Therefore, a lower space of the base bracket 18 can be ensured and when load is applied to the grip bracket 19, an effect of absorbing energy by plastically deforming the grip bracket 19 per se is the same as that of the above-described embodiment.

Figure 9:
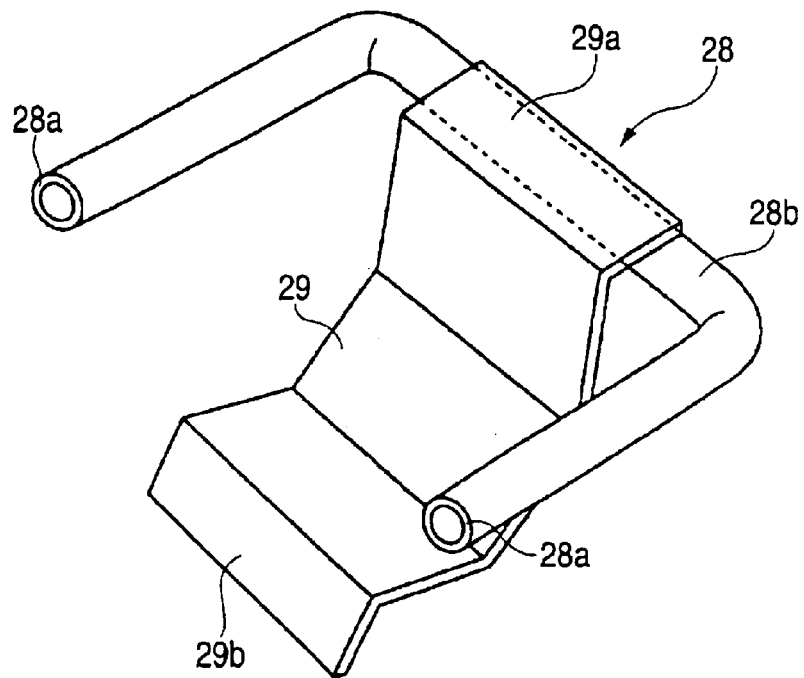
FIG. 9 is a perspective view of a second modified example of the bracket attaching structure according to the embodiment of the invention.

In FIG. 9, a base bracket 28 constituted by bending a pipe in a channel-like shape is used in place of the base bracket 8 in the plate-like shape. According to the base bracket 28, both end portions 28a are fixed to the roof side inner panel, not illustrated, by welding; an upper end portion 29a of a grip bracket 29 is fixed to the base bracket 28 from an outer vehicle compartment side by welding and a lower end portion 29b thereof is fixed to the roof side inner panel.

A front end portion 28b of the base bracket 28 is fixed to project to the vehicle compartment side of the upper end portion side bonding portion of the roof side inner panel 6 and the side body outer panel 7 shown in FIG. 3.

By such a structure, the lower space of the grip bracket 29 can be ensured and when load is applied to the grip bracket 29, an effect of absorbing energy by plastically deforming the grip bracket 29 per se is the same as that of the above-described embodiment.

Figure 10:
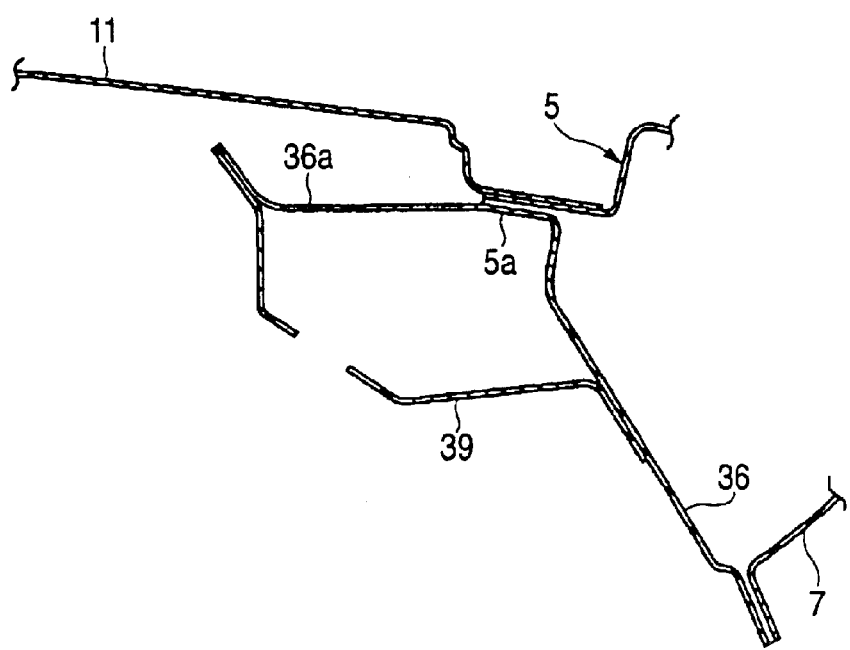
FIG. 10 is a sectional view of a third modified example of the bracket attaching structure according to the embodiment of the invention.
Figure 11:
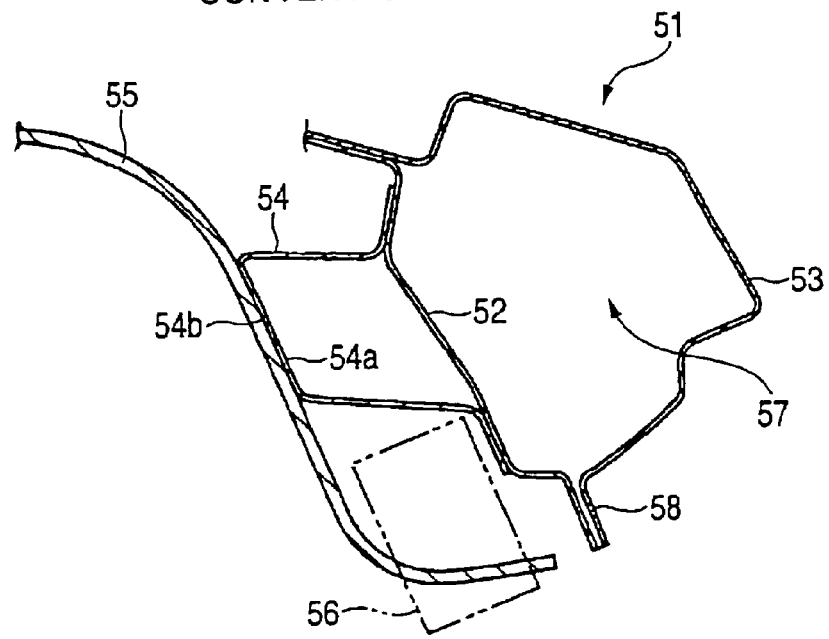
FIG. 11 is a sectional view of a roof side rail portion of a bracket attaching structure according to an example of a conventional art.
Figure 12:
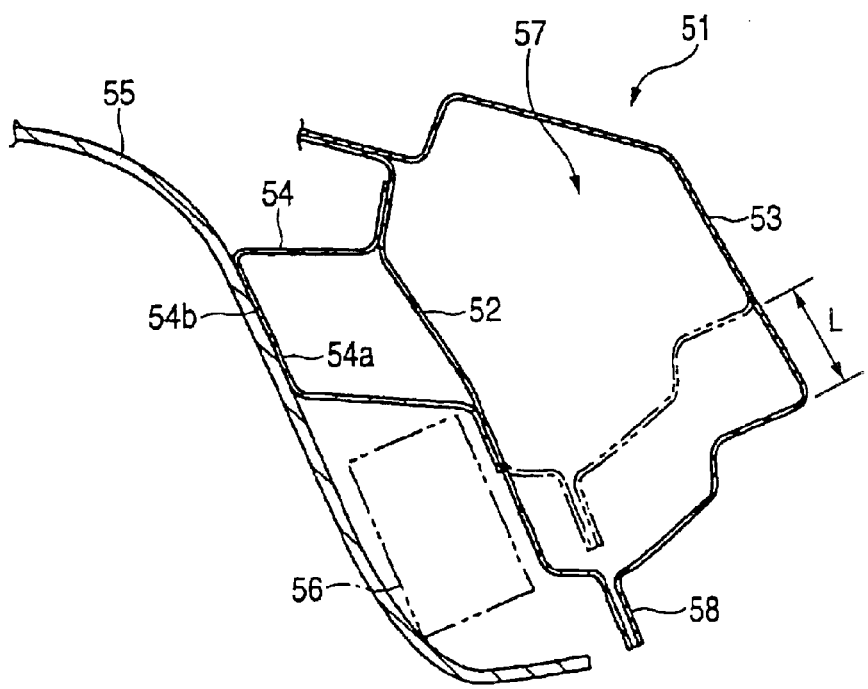
FIG. 12 is a sectional view showing a state of extending the roof side rail portion of FIG. 11 to a lower side.

In FIG. 10, an upper end side front end portion 36a of a roof side inner panel 36 is projected in a beam-like shape to a side of the inner compartment 2 of the bonding portion 5a of the roof side inner panel 6 and the side body outer panel 7 and the roof panel 11 to serve as a base bracket. Further, a grip bracket 39 is fixed to the roof side inner panel 36 by welding.

By such a structure, the lower space 12 of the grip bracket 39 can widely be ensured and when load is applied to the grip bracket 39, an effect of absorbing energy by plastically deforming the grip bracket 39 per se is the same as that of the above-described embodiment.

Although the embodiment of the invention has been explained as described above, naturally, the invention is not limited thereto but can variously be modified and changed based on the technical thought of the invention.

For example, although according to the above-described embodiment, the upper end side of the base bracket 8 is projected to the side of the inner vehicle compartment 2 of the bonding portion of the roof side inner panel 6 and the side body outer panel 7, when there is allowance of space on the upper side, the front end portion may be projected in a skewed upper direction or an upper direction.

As described above, according to the present invention, in a bracket attaching structure forming a closed section by bonding upper end portions and lower end portions of respectives of a roof side inner panel and a side body outer panel of an vehicle and including an attaching bracket for mounting an assistant grip on an inner vehicle compartment side of the roof inner panel, the attaching bracket includes a base bracket attached to the roof side inner panel and a grip bracket attached to the base bracket and an upper end portion of the base bracket is fixed to the roof side inner panel to project to a side of a vehicle compartment or an upper side of the vehicle compartment of a bonding portion on a side of the upper end portions of the roof side inner panel and the side body outer panel and therefore, a space on a lower side of the attaching bracket for mounting the assistant grip can be enlarged.

According to the present invention, the grip bracket includes a curved face in which a sectional shape thereof in a vehicle width direction is formed substantially in a hat-like shape, and a extending direction of one face constituting the curved face in the hat-like shape substantially coincides with a direction of applying a load of the assistant grip, and therefore, a pulling force when the passenger grasps the assistant grip is increased.

Further, according to the present invention, each of the base bracket and the grip bracket is formed at least with either one or both of a flange and a bead for reinforcing and therefore, the strength can be increased and plate thicknesses of the respective brackets can be thinned.

Further, according to the present invention, the base bracket is formed with an escape hole which can be penetrated by an attaching portion of the assistant grip projected from a top portion of the grip bracket to an outer vehicle side when the assistant grip is attached to the grip bracket and therefore, when load is applied to the assistant grip and the grip bracket is deformed, an amount of deforming the grip bracket can be increased such that the attaching portion is not hampered by the base bracket.

What is claimed is:

1. A bracket attaching structure for a vehicle comprising:

a closed section formed by bonding upper end portions and lower end portions of a roof side inner panel and a side body outer panel, and an attaching bracket for mounting an assistant grip on an inner vehicle compartment side of the roof side inner panel, wherein the attaching bracket includes a base bracket attached to the roof side inner panel and a grip bracket attached to the base bracket, and an upper end portion of the base bracket is fixed to the roof side inner panel to project to a side of a vehicle compartment or an upper side of the vehicle compartment from a bonding portion where the upper end portions of the roof side inner panel and the side body outer panel are bonded thereon.

2. The bracket attaching structure according to claim 1, wherein the grip bracket includes a curved face in which a sectional shape thereof in a vehicle width direction is formed substantially in a hat-like shape, and an extending direction of one face comprising the curved face in the hat-like shape substantially coinciding with a direction of an applied load of the assistant grip.

3. The bracket attaching structure according to claim 1, further comprising at least one of a flange and a bead to reinforce each of the base bracket and the grip bracket.

4. The bracket attaching structure according to claim 1, further comprising an escape hole formed on the base bracket, wherein an attaching portion of the assistant grip is configured to be inserted through the escape hole and is configured to project from a top portion of the grip bracket to an outer vehicle side when the assistant grip is attached to the grip bracket.

* * * * *